United States Patent
Ohmi et al.

[11] Patent Number: 5,816,285
[45] Date of Patent: Oct. 6, 1998

[54] PRESSURE TYPE FLOW RATE CONTROL APPARATUS

[75] Inventors: Tadahiro Ohmi, 2-1-17-301, Komegafukuro, Aoba-ku, Sendai-shi, Miyagi-ken; Koji Nishino, Osaka; Nobukazu Ikeda, Osaka; Akihiro Morimoto, Osaka; Yukio Minami, Osaka; Koji Kawada, Osaka; Ryosuke Dohi, Osaka; Hiroyuki Fukuda, Osaka, all of Japan

[73] Assignees: Fujikin Incorporated, Osaka; Tadahiro Ohmi, Miyagi-ken, both of Japan

[21] Appl. No.: 907,951

[22] Filed: Aug. 11, 1997

[30] Foreign Application Priority Data

Aug. 12, 1996 [JP] Japan .................................... 8-212330

[51] Int. Cl.$^6$ ................................................. F16K 31/12
[52] U.S. Cl. ...................................... 137/487.5; 137/486
[58] Field of Search ................................ 137/487.5, 486, 137/14; 138/44

[56] References Cited

U.S. PATENT DOCUMENTS

| | | |
|---|---|---|
| 4,431,020 | 2/1984 | Kowalski . |
| 4,508,127 | 4/1985 | Thurston . |
| 4,573,491 | 3/1986 | Arens et al. . |
| 4,794,947 | 1/1989 | Kuramochi ........................... 137/487.5 |
| 4,836,233 | 6/1989 | Milgate, III . |
| 4,895,500 | 1/1990 | Hök et al. . |
| 4,977,916 | 12/1990 | Ohmi et al. ............................... 137/486 |
| 5,129,418 | 7/1992 | Shimomura et al. ................. 137/487.5 |
| 5,146,941 | 9/1992 | Statler .................................... 137/487.5 |
| 5,148,829 | 9/1992 | Deville . |
| 5,159,951 | 11/1992 | Ono et al. ................................. 137/486 |
| 5,190,068 | 3/1993 | Philbin . |
| 5,224,510 | 7/1993 | Pericles .................................. 137/487.5 |
| 5,447,173 | 9/1995 | Kazama et al. ....................... 137/487.5 |
| 5,660,198 | 8/1997 | McClaran .............................. 137/487.5 |

*Primary Examiner*—Henry A. Bennett
*Assistant Examiner*—Joanne Y. Kim
*Attorney, Agent, or Firm*—Griffin, Butler, Whisenhunt & Szipl

[57] ABSTRACT

A pressure type flow rate control apparatus (1) controls flow rate of a fluid in an environment where a ratio of P2/P1 between an absolute pressure P1 at an upstream side of an orifice and an absolute pressure P2 at a downstream side of the orifice is maintained at a value less than about 0.7. The apparatus comprises: a plate for forming the orifice (5); a control valve (2) positioned upstream of the orifice; an orifice corresponding valve (9) positioned downstream of the orifice (5); a primary pressure detector (3) positioned between the control valve (2) and the orifice (5); a secondary pressure detector (11) positioned downstream of the orifice (5); a calculation control device (6) for calculating flow rate Qc on the basis of the measured pressure P1 of the primary pressure detector (3) by a formula Qc=KP1 (K being a constant) and for outputting as a control signal Qy a difference between a flow rate command signal Qs and the calculated flow rate signal Qc to a drive unit (14) of the control valve 2; and a pressure comparing, calculating apparatus (10) for calculating the ratio of P2/P1 between the detected pressure P1 of the primary pressure detector (3) and the detected pressure P2 of the secondary pressure detector (11). The pressure P1 upstream of the orifice is adjusted by opening and closing the control valve by the control signal Qy, thereby controlling the flow rate downstream of the orifice.

6 Claims, 14 Drawing Sheets

(ORIFICE OF A ROUND AND STRAIGHT HOLE)

(ORIFICE OF A ROUND AND STRAIGHT HOLE)

5,816,285

PRESSURE TYPE FLOW RATE CONTROL APPARATUS

BACKGROUND OF THE INVENTION

The present invention relates to an improved control apparatus for gas or the like of a type mainly used in semiconductor manufacturing plants and chemical manufacturing plants.

1. Prior Art

Gas flow rate control apparatus, so-called mass flow controllers, have been widely employed in semiconductor manufacturing plant.

Such prior-art mass flow controllers, however, have various problems; for example: (1) response speeds have been relatively slow in cases of thermal-type flow rate sensors, (2) control precision in low flow rate regions have been poor and precision has varied among products, (3) operating troubles have occurred frequently and stability has been insufficient, and (4) product prices have been high, replacement parts have been expensive, and hence operating costs have been high.

To avoid such problems of mass flow controllers, differential pressure type flow rate control apparatus, such as the structure shown in FIG. 17, are widely used.

That is, such a differential pressure type flow rate control apparatus determines a differential pressure $\Delta P$ between fluid at upstream and downstream sides of an orifice 30 from detected values of pressure detectors 31, 32, calculates in its CPU a detected flow rate as $Qc = K \sqrt{\Delta P}$ and a flow rate difference $(Qy = Qc - Qs)$ between the detected flow rate Qc and a set flow rate Qs, issues the flow rate difference Qy to a flow rate control valve 33 as a control signal, and controls opening and closing of the flow rate control valve 33 for bringing the flow rate difference Qy to zero.

This differential pressure type flow rate control apparatus has its own problems; that is: (1) since a range of the detected flow rate Qc is raised to a power of ½ of a range of the pressure detectors 31, 32, the detection precision of the detected flow rate Qc drops; and (2) to raise the measuring precision of flow rate, it is necessary to form a laminar flow of fluid by installing relatively long straight ducts at the upstream and downstream sides of the orifice, which consequently increases the size of the apparatus.

2. Problems that the Invention Solves

It is hence a direct object of the invention to provide a pressure type flow rate control apparatus which avoids the problems in mass flow controllers and differential pressure type flow rate control apparatus such as: (1) generally low detecting precision and (2) difficulty in reducing the size of apparatus. Hence it is an object of this invention to provide a pressure type flow rate control apparatus capable of controlling flow rate to a high precision, but yet being relatively small in size and relatively low in manufacturing cost. Similarly, it is an object of this invention to provide such a pressure type flow rate control apparatus which operates by calculating a detected flow rate in a form normally proportional to a detected pressure value on a basis of a detected pressure of a primary side pressure detector.

SUMMARY

According to principles of the invention, in an apparatus described herein, a state where a ratio of P2/P1 between an absolute pressure P1 at an upstream side of an orifice and an absolute pressure P2 at a downstream side of the orifice is maintained at a value less than about 0.7, wherein the pressure P1 upstream of the orifice is adjusted by opening and closing the control valve by the control signal Qy, thereby controlling the flow rate downstream of the orifice.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
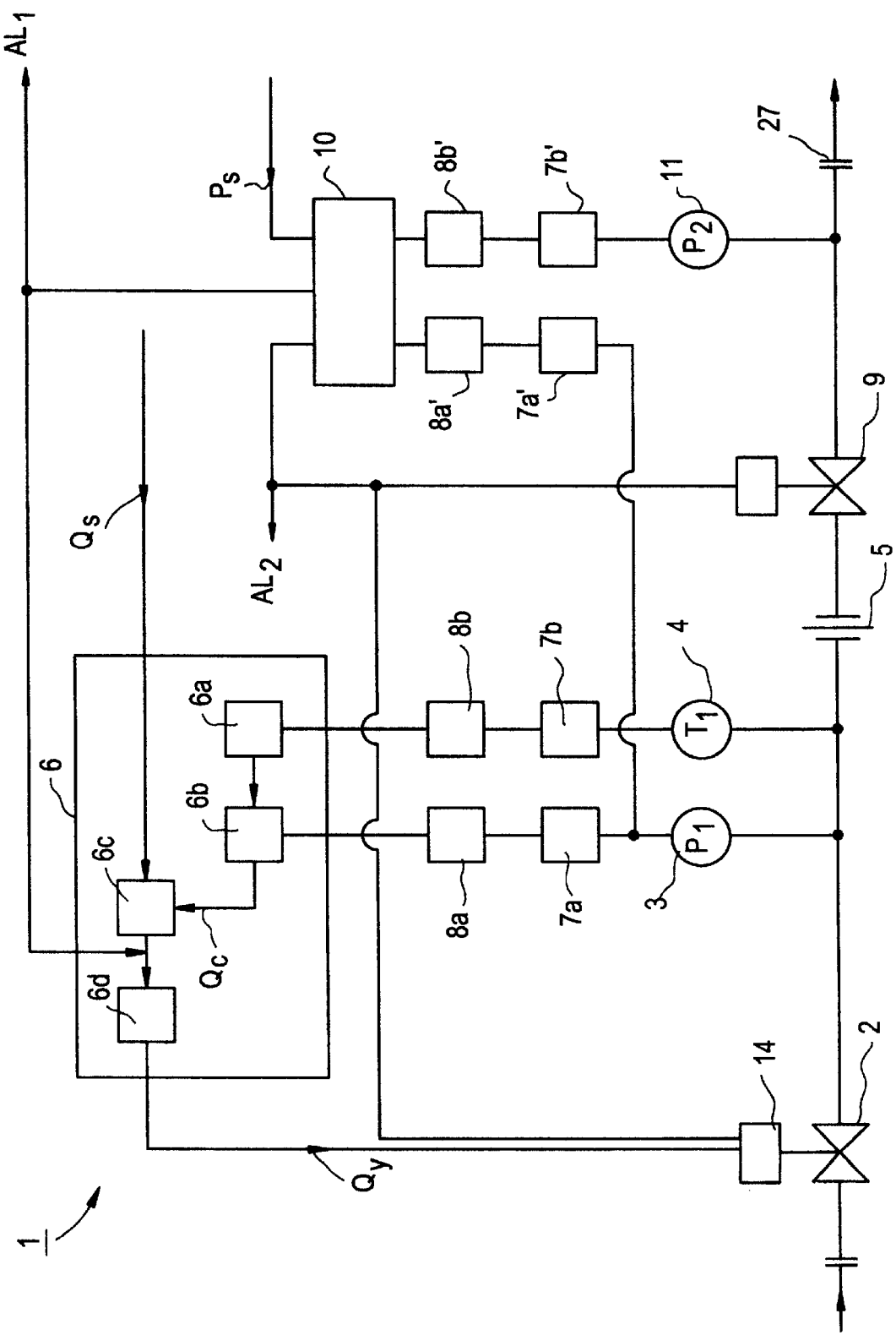
FIG. 1 is a block diagram showing a structure of a pressure type flow rate control apparatus of this invention.

By way of background, a known feature of gas flowing through a nozzle is that: when a pressure ratio P2/P1 of gas upstream and downstream of a nozzle becomes lower than a critical pressure ratio of gas (about 0.5~0.6 in the case of air or nitrogen), a flow velocity of the gas passing through the nozzle reaches sound velocity, and pressure fluctuations at the downstream side of the nozzle are not propagated to the upstream side, so that a stable mass flow rate corresponding to the state of the upstream side of the nozzle is obtained.

In the case of a nozzle, owing to the viscosity of the gas, a product of a nozzle sectional area and the sound velocity does not directly express actual flow rate of the gas, and to calculate the flow rate of the gas, as a matter of course, an effluence coefficient determined by a form (or shape) of the nozzle must be obtained.

Accordingly, in arriving at the present invention, repeated tests to obtain effluence coefficients for various forms of nozzles and fluids (gases) were carried out. It was noted in the process of these repeated tests that the downstream side pressure fluctuations were not propagated to the upstream side when the pressure ratio P2/P1 of gas was below a certain value. The relationship between the orifice form (or shape) and gas flow rate and the relationship between the gas pressure P1 of upstream side and gas flow rate with a small orifice instead of a nozzle was further measured and tested. As a result, it was discovered that the gas flow rate passing through a plate-shaped small orifice changes in normal, or direct, proportion to the gas pressure P1 of the upstream side, regardless of the type of gas, when the diameter of the small orifice is constant, so long as the pressure ratio P2/P1 of gas is below a certain value.

That is, the detected gas flow rate Qc passing through the small orifice is normally proportional to the pressure P1 on the upstream side of the orifice and hence by automatically controlling the upstream side pressure P1, it is possible to realize feedback control of the flow rate passing through the orifice.

Moreover, since the gas flow rate passing through the orifice is not affected by the gas flow velocity distribution at the upstream side of the orifice or pressure fluctuations at the downstream side the orifice, a straight duct is not needed at the upstream side, and the size of the apparatus can be reduced substantially, so that manufacturing costs of the flow rate control apparatus can be lowered.

Furthermore, because a linear function is established between the flow rate and the pressure, the range of the pressure detection apparatus and that of flow rate becomes identical. Therefore, as compared with conventional differential pressure type flow rate control apparatus, a higher flow-rate-detection precision is achieved.

Hitherto, in manufacturing a flow rate control valve of a disk touch type, it has been the empirical practice to calculate gas flow rate Qc passing through the valve by the formula Qc=KSP1 (where S is a minimum flow passage area, P1 is a primary side pressure, and K is a constant) in the case of the pressure ratio P2/P1 of gas below a certain value.

However, the actual gas flow rate Q in this flow rate control valve is about ±20% of the flow rate calculated in the formula of Qc=KSP1, and it is difficult to apply the relation of Qc=KSP1 to precise measurement of gas flow rate. The invention has been created on a basis of the above findings by the inventors, and relates to a pressure type flow rate control apparatus for controlling flow rate of a fluid by maintaining the absolute pressure P1 upstream of an orifice at about 1.4 or more times a downstream-side absolute pressure P2, comprising: an orifice 5; a control valve 2 provided at an upstream side of the orifice 5; an orifice corresponding valve 9 downstream of the orifice 5; a primary pressure detector 3 provided between the control valve 2 and the orifice 5; a secondary pressure detector 11 downstream of the orifice 5; a calculation control device 6 for calculating a flow rate Qc based on the detected pressure P1 of the pressure detector 3 using the formula Qc=KP1 (K being a constant), and feeding a difference between a flow rate command signal Qs and the calculated flow rate signal Qc to a drive unit 14 of the control valve 2 as a control signal Qy; and a pressure comparing, calculating apparatus 10 for calculating the ratio P2/P1 between the detected pressure P1 of the primary pressure detector 3 and the detected pressure P2 of the secondary pressure detector 11; wherein the pressure P1 upstream of the orifice is adjusted by opening and closing of the control valve with the control signal Qy, thereby controlling the flow rate downstream of the orifice.

Operation of the Invention

The fluid primary pressure P1 at the upstream side of the orifice 5 is detected by the primary pressure detector 3, and is fed to the calculation control device 6.

In the calculation control device, the flow rate Qc is calculated using the formula of Qc=KP1, and the flow rate command value Qs and Qc are compared and a control signal Qy corresponding to the difference between Qc–Qs is fed into the drive unit 14 of the control valve 2.

That is, the control valve 2 is opened or closed by the control signal Qy for bringing the difference Qc–Qs to zero so that the flow rate Qc downstream of the orifice is always held at the set flow rate (flow rate command value) Qs.

If the fluid secondary pressure P2 downstream of the orifice 5 rises and a value of P2/P1 exceeds a set value Ps (about 0.7), flow rate control by the present flow rate control apparatus 1 is stopped. That is to say, a warning is dispatched, and the automatic control of the control valve 2 by the control signal Qy is stopped and an operator manually controls the flow rate by adjusting, manually or by other means, the opening degree of the control valve 2 and the orifice corresponding valve 9.

Further, if the fluid secondary pressure P2 rises and a value of P2/P1 approaches about 1.0, a warning is dispatched and valve closing signals are dispatched to the control valve 2 and the orifice corresponding valve 9. As a result, a back flow of the fluid from the secondary side is prevented.

Embodiments

Referring now to the drawings, an embodiment of the invention is described below. FIG. 1 is a block diagram of a flow rate control apparatus 1 of the invention, in which this flow rate control apparatus is comprised of the control valve 2, the primary pressure detector 3, a temperature detector 4, the orifice 5, the flow rate calculation apparatus 6, amplifiers 7a, 7b, A/D converters 8a, 8b, an orifice corresponding valve 9, a pressure comparing, calculating apparatus 10, A/D converters 8a', 8b', amplifiers 7a', 7b', the secondary pressure detector 11, a gas take-out joint 27 and other elements.

The control valve 2 is a metal diaphragm valve of a so-called direct touch type described below, and its drive unit includes a piezoelectric-element type drive device. Other possible examples of the drive unit of the control valve 2 may include, among others, magnetic-distortion-element type drive devices, solenoid type drive devices, motor type drive devices, air pressure type drive devices and thermal-expansion type drive devices.

The primary pressure detector 3 and secondary pressure detector 11 are semiconductor distortion type pressure sensors, but the pressure detectors 3, 11 may also be metal-foil-distortion type pressure sensors, electrostatic-capacity type pressure sensors, magnetic-resistance type pressure sensors, and other types of pressure sensors. A resistance bulb-type temperature sensor and other types of temperature sensors may also be used as the temperature detector 4, instead of a thermocouple type temperature sensor.

The orifice 5 is produced by cutting a hole in a shape of a bugle with a spark cutter in a thin metal plate gasket, but an orifice which is formed in a metal membrane with an extremely thin pipe or etching may also be used.

Figure 2:
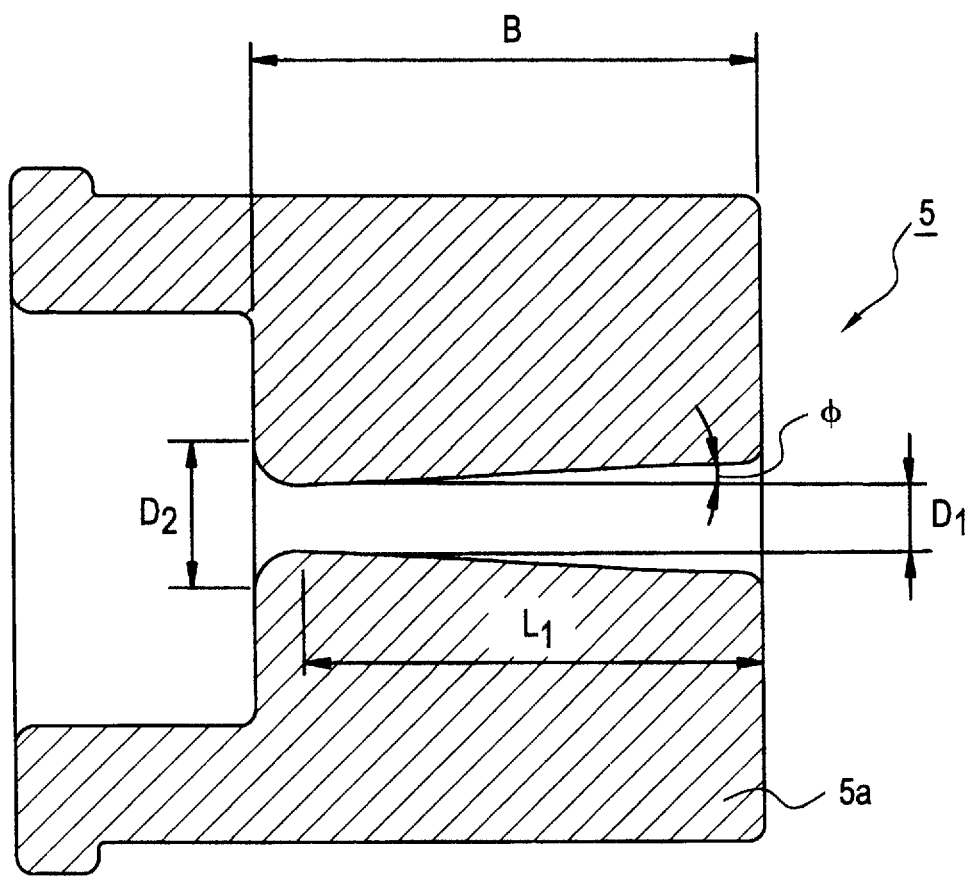
FIG. 2 is a vertical sectional view of an example of an orifice used in the apparatus of FIG. 1.

According to the present embodiment, the orifice 5 has a vertical sectional shape which is similar to that of an open mouth of a bugle. The orifice 5 has a portion with a maximum diameter which faces the upstream side, a portion with a minimum diameter located in the middle and a portion with a medium diameter which faces the downstream side, all as shown in FIG. 2. Specifically, in one embodiment, the orifice 5 is a small hole which is cut in a 7 mm thick stainless steel plate 5a, with an inside diameter D1 of the minimum diameter porting being about 0.2 mm, a hole total length B being about 1.2 mm, a length L1 from the minimum diameter portion to an end being about 1.0 mm, an inside diameter D2 of the maximum diameter portion being about 0.6 mm ø, and an inclination ø of the hole having the diverging diameter being about 3 degrees.

The flow rate calculation apparatus 6 is formed of a so-called control circuit board and comprises a temperature correction circuit 6a, a flow rate calculation circuit 6b, a comparator 6c, an amplifier 6d and other elements.

Figure 3:
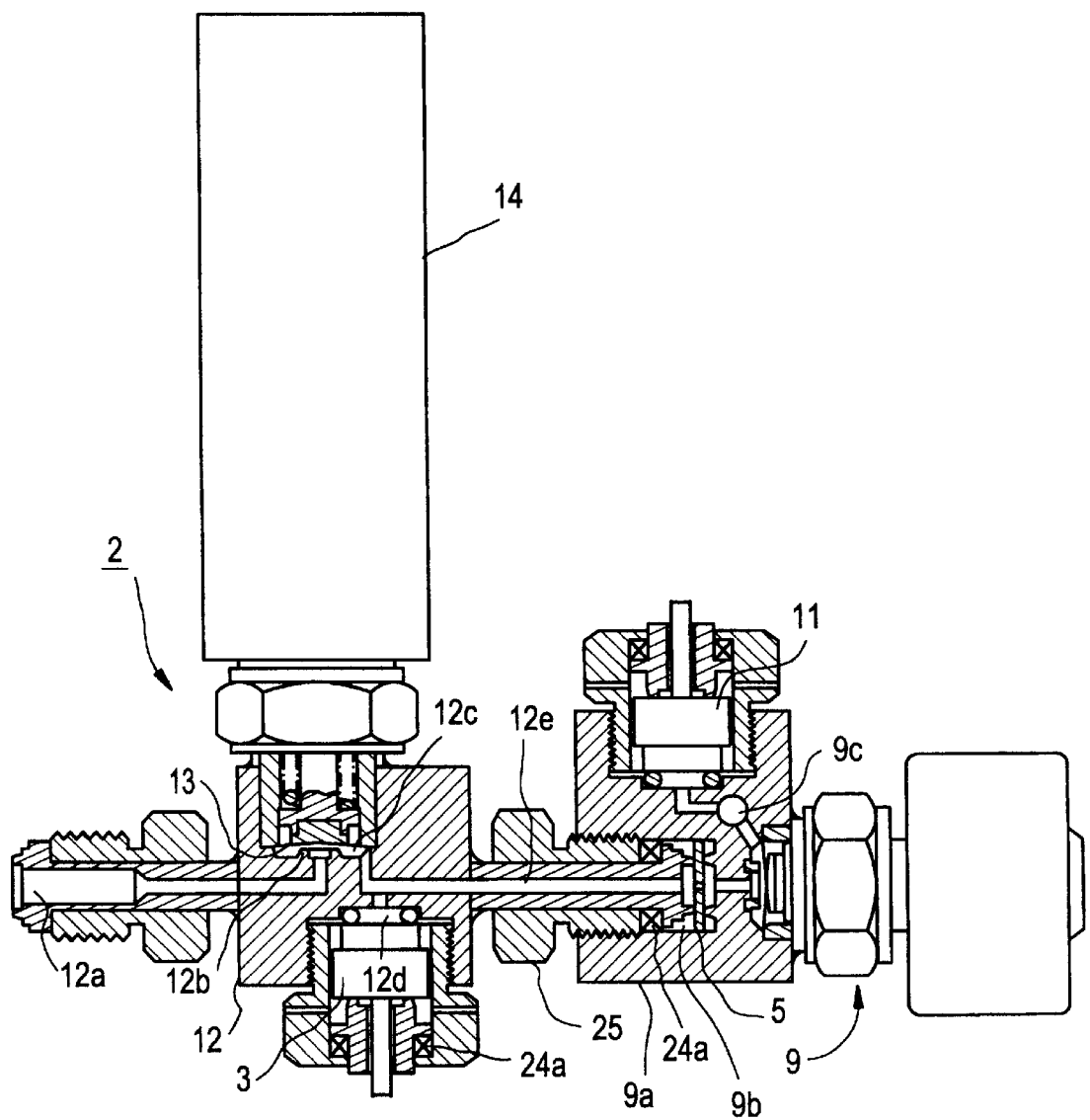
FIG. 3 is a vertical, partially sectional, view of a pressure type flow rate control apparatus of this invention.

Further, the pressure comparing, calculating apparatus 10 is also formed of a control circuit board, like the flow rate calculation apparatus 6, and is where P2/P1 is calculated and a comparison with the set value Ps is conducted. As explained below, the control circuit boards of the flow rate calculation apparatus 6 and the pressure comparing, calculating apparatus 10 are incorporated inside a case, as shown in FIG. 3.

Referring to FIG. 1, the gas pressure P1 at the outlet side of the control valve 2, that is at the upstream side 5 of the orifice 5, is detected by the pressure detector 3, and a corresponding signal, digitized through the amplifier 7a and A/D converter 8a, is fed into the flow rate calculation circuit 6b.

Similarly, the gas temperature T1 upstream of the orifice is detected by the temperature detector 4, and a signal digitized through the amplifier 7b and A/D converter 8b is fed into the temperature correction circuit 6a.

In the flow rate calculation circuit 6b, a flow rate Q'=KP1 is calculated using the pressure signal P1, and the flow rate Q' is subject to temperature correction by using the correction signal from the temperature correction circuit 6a, and a calculated flow rate signal Qc is fed into the comparator 6c.

On the other hand, a flow rate command signal Qs is fed into the comparator 6c where it is compared with the calculated flow rate signal Qc, and the difference signal Qy=Qc−Qs is output to the drive unit 14 of the control valve 2 as a control signal.

That is, when the calculated flow rate signal Qc is greater than the flow rate command signal Qs, the valve drive unit 14 is operated in a direction of closing the valve 2, and when the Qc is smaller than the Qs, it is operated in a direction of opening the control valve 2, thereby automatically controlling the opening degree of the control valve 2 to achieve Qc=Qs.

As a matter of course, in the invention, it is required that, between the gas pressure P1, upstream of the orifice, and the gas pressure P2, downstream of the orifice, a ratio of P2/P1 must be smaller than about 0.7; that is, the upstream gas pressure P1 must be more than about 1.4 times as large as the downstream pressure P2. This should always be established.

Accordingly, as indicated in FIG. 1, the upstream-side gas pressure P1 and downstream-side pressure P2 are fed into the pressure comparing, calculating apparatus 10, and Ps (about 0.7) is set.

When a state of P2/P1 >0.7 occurs (that is, a flow rate control of high precision is no longer effected, although a counter flow is not caused), a warning signal AL1 is dispatched by the pressure comparing calculating apparatus 10 and the control signal Qy which is fed from the flow rate control circuit 6 into the control valve 2 is stopped by the warning signal AL1. As a result, the control valve 2 and the orifice corresponding valve 9 are changed over to a state where the valve 2 and valve 9 are manually operated. An operator controls the flow rate by manual operation for supplying the fluid. Needless to say, however, the flow rate control can also be effected, not by manual operation, but in a remote controlled, automatic manner, by an operation signal from a different system.

Figure 4:
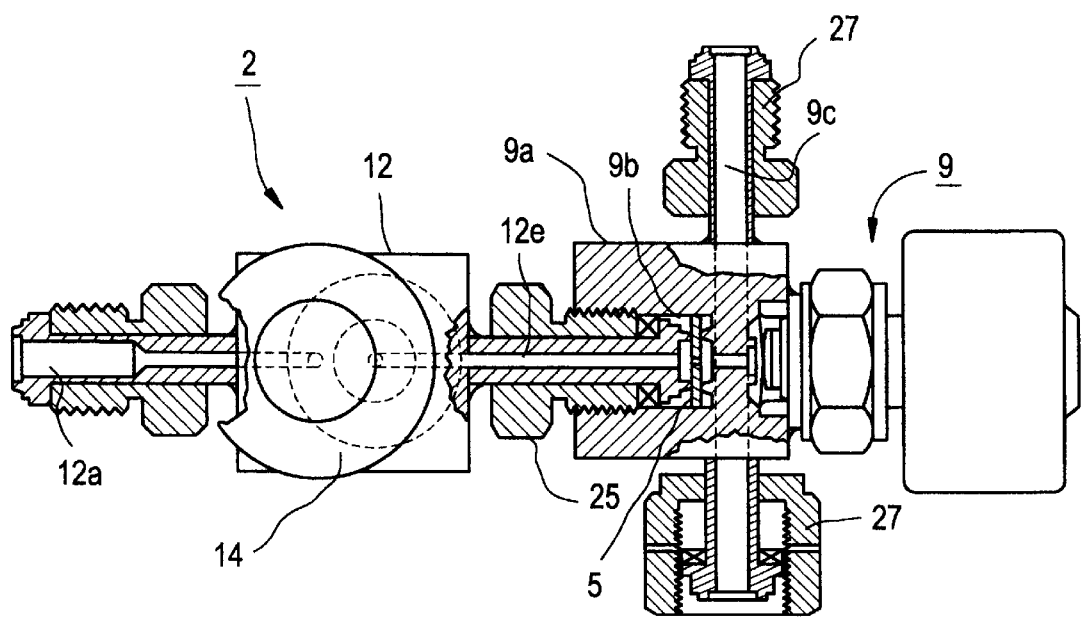
FIG. 4 is a lateral, partially sectional, view of the pressure type flow rate control apparatus of FIG. 3.
Figure 5:
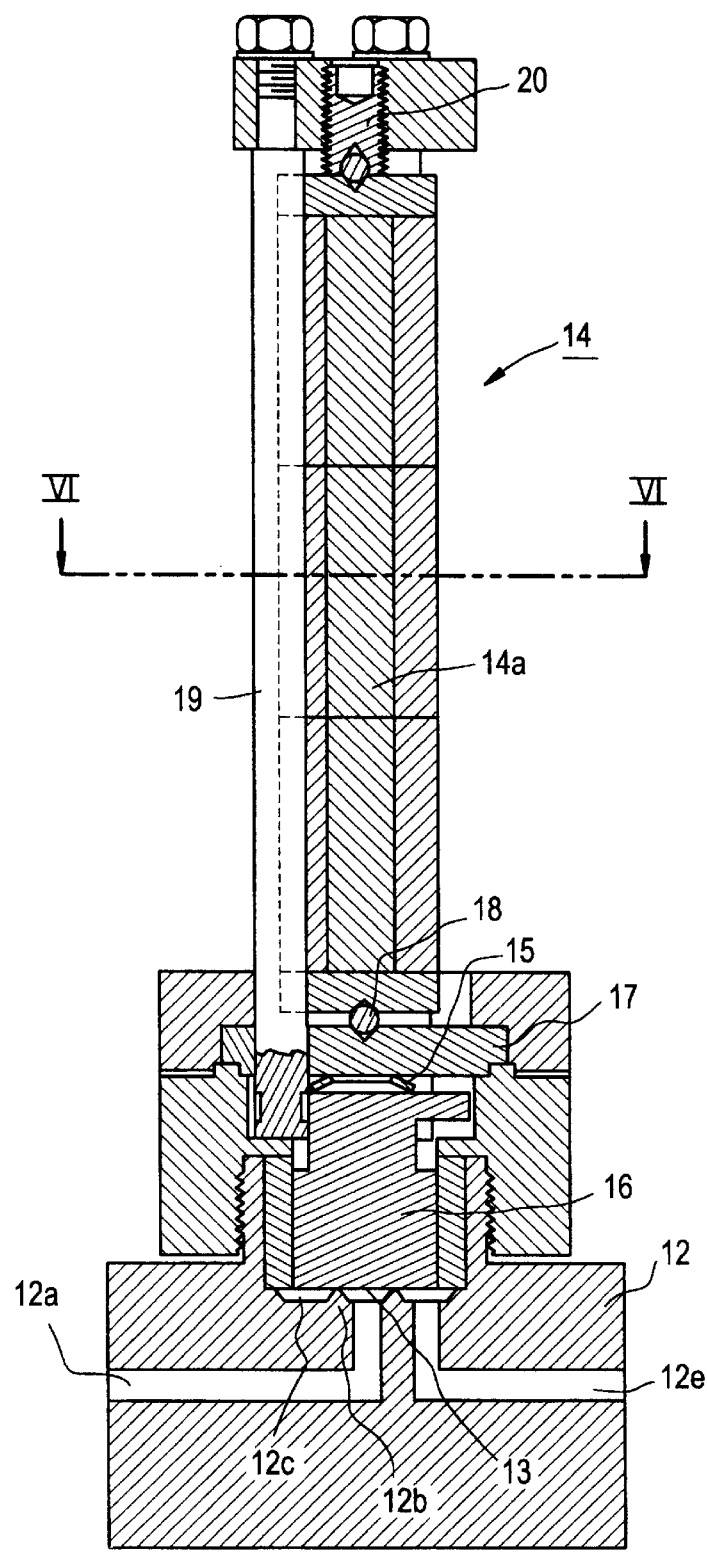
FIG. 5 is a vertical sectional view of a piezoelectric element type drive unit of a control valve for use in a device of this invention.
Figure 6:
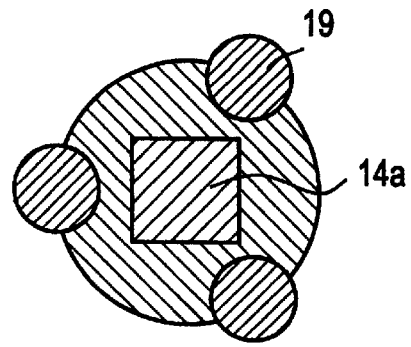
FIG. 6 is a sectional view taken on line VI—VI in FIG. 5.

If P2/P1, the ratio of the pressure P2 to the pressure P1, approaches about 1.0, which is a state where a counter flow is expected, the warning signal AL2 is dispatched by the pressure comparing, calculating apparatus 10 and the orifice corresponding valve 9 and the control valve 2 are automatically closed. FIGS. 3 and 4 are respectively a vertical sectional view and a lateral sectional view showing an example of a portion of a first embodiment of an apparatus of the invention, excluding the flow rate calculation control device 6 and the pressure comparing, calculating apparatus 10, and FIGS. 5 and 6 are respectively a vertical sectional view and a lateral sectional view of a piezoelectricelement-type drive unit. In FIGS. 3 to 5, reference numeral 2 identifies the control valve, 3 identifies the primary pressure detector, 5 identifies the orifice, 9 identifies the orifice corresponding valve, 27 identifies the gas take-out joint, 11 identifies the secondary pressure detector, 12 identifies a valve main body, 13 identifies a diaphragm, and 14 identifies the drive unit.

The control valve 2 is comprised of the valve main body 12 made of stainless steel for defining a fluid inlet 12a, a valve seat 12b, a valve chamber 12c, a pressure detector mounting hole 12d, and a fluid outlet 12e, and other elements including the diaphragm 13 made of stainless steel, nickel, or cobalt alloy, and the piezoelectric element type drive unit 14 for pressing the diaphragm 13 downward.

The diaphragm 13 is always pressed downward by elasticity of a belleville spring 15, thereby shutting against the valve seat 12b.

Furthermore, a diaphragm holder 16 is pulled upwardly by a piezoelectric element support member 19 by applying an input to a piezoelectric element 14a, when it is extended. As a result, the diaphragm 13 elastically returns upwardly departing from the valve seat 2b, so that the vale is opened.

In this embodiment, as shown in FIG. 5, the piezoelectric element drive unit 14 comprises a combination of three, series connected, piezo element units 14a having a displacement of 16 μm, 10 mm×10 mm×18 mm and in FIGS. 5 and 6, reference numeral 16 identifies the diaphragm holder, 17 identifies a base body, 18 identifies a ball, 19 identifies a piezoelectric element support member (superInvar material), and 20 identifies a stroke adjusting screw.

The piezoelectric element support member 19 is made of Super-Invar material whose thermal expansion rate is nearly equal to a rate of thermal expansion of the piezoelectric elements (piezo elements).

Figure 7:
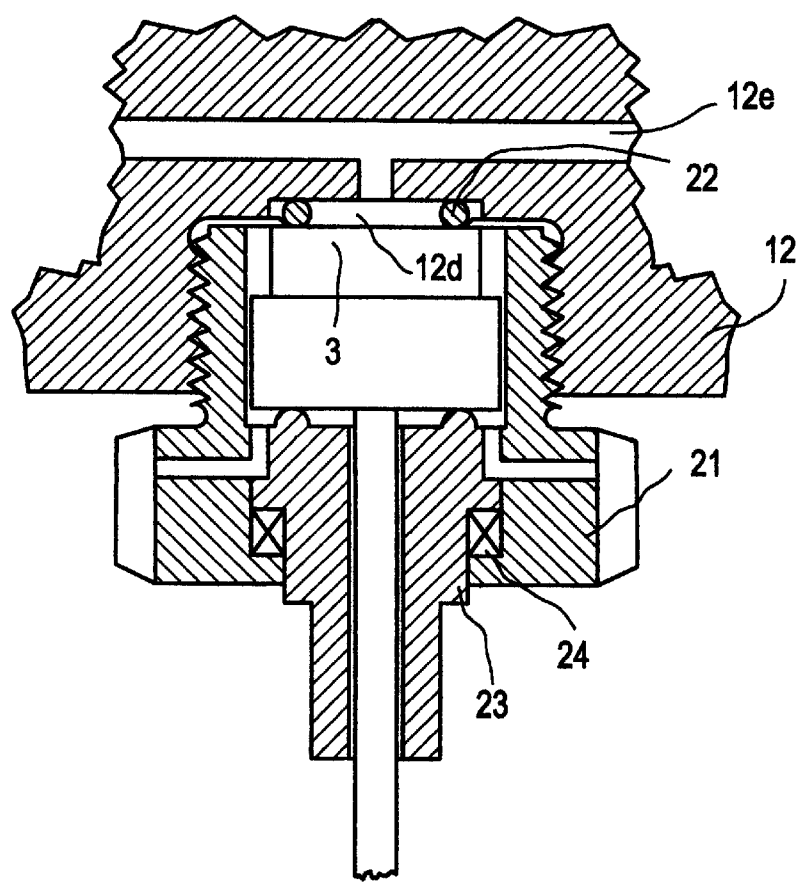
FIG. 7 is a segmented, vertical, sectional view showing a mounting part of a pressure detector of a pressure type flow rate control apparatus of this invention.

FIG. 7 shows in detail a part where the primary pressure detector 3 is mounted, and in this embodiment, the primary pressure detector 3, made of semiconductor strain gauges, is held air-tightly against a metal O-ring 22 in the mounting hole 12d, provided at a lower face of the valve main body 12, by set nuts 21.

In FIG. 7, reference numeral 23 identifies a sleeve, and 24 identifies a bearing, and instead of the metal Oring 22, a metal C-ring or metal gasket may also be used.

Figure 8:
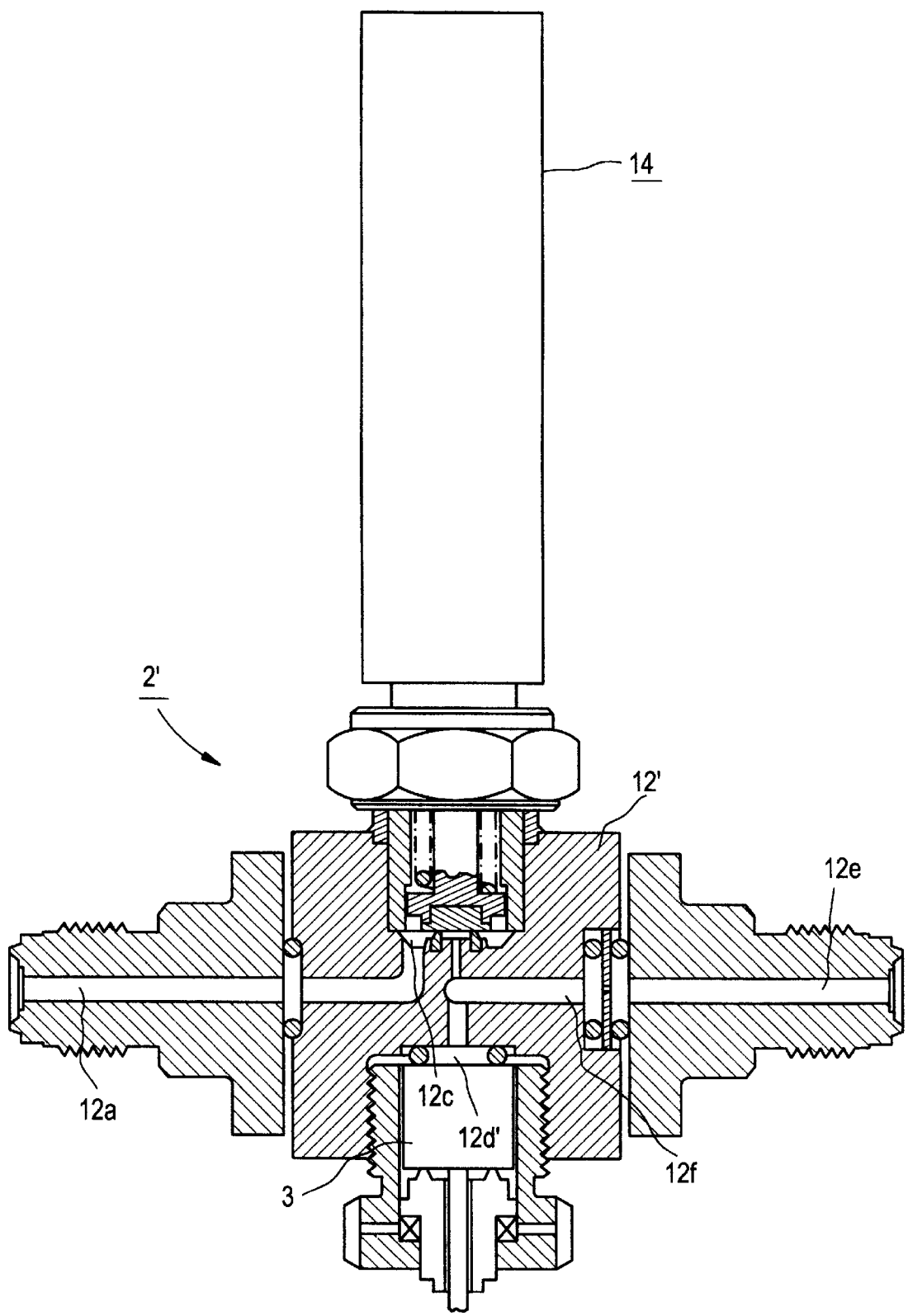
FIG. 8 is a vertical, partially-sectional, view showing another embodiment of the pressure type flow rate control apparatus of this invention.

Although not illustrated in such detail, the secondary pressure detector 11 is the same type of gauge as the primary pressure detector 3. As shown in FIG. 3, the secondary pressure detector 11 is mounted, in the same manner as the primary pressure detector 3, in a mounting hole provided in a valve main body 9a of the orifice corresponding valve 9. Furthermore, in the depicted embodiment, the primary pressure detector mounting hole 12d is formed in the bottom, slightly downstream of the valve chamber 12c, of the valve main body 12, but, as shown in FIG. 8, a mounting hole 12d' may be provided opposite the valve chamber 12c at a lower face of a valve main body 12'.

The orifice 5 is provided at the downstream side of the primary pressure detector 3 as shown in FIG. 3, and in this embodiment it is positioned in a fluid inlet 9b of the valve main body 9a of the orifice corresponding valve 9, a metal diaphragm type valve, and is fixed via a bearing 24a by tightening a set screw 25. In FIGS. 3 and 4, reference number 9c identifies a fluid outlet of the orifice-corresponding valve 9.

Figure 9:
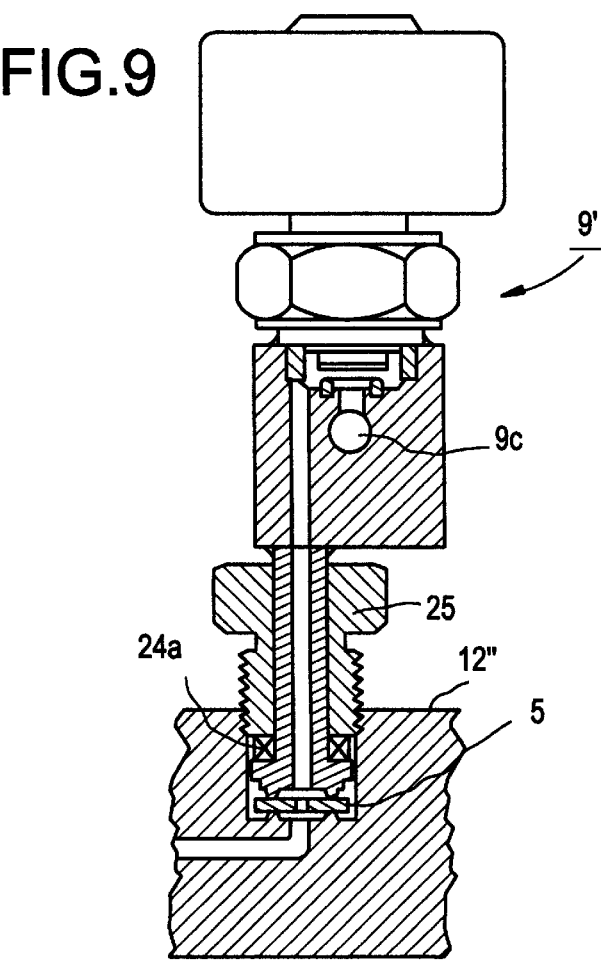
FIG. 9 is a segmented, vertical, partially-sectional view showing another embodiment for providing an orifice in a valve main body of a control valve of this invention.

FIG. 9 shows an example of mounting an orifice 5 in a valve main body 12" of a control valve 2', with the structure itself for mounting being similar to that of FIG. 3 in which the orifice is mounted in the valve main body 9a of the orifice-corresponding valve 9.

Figure 10:
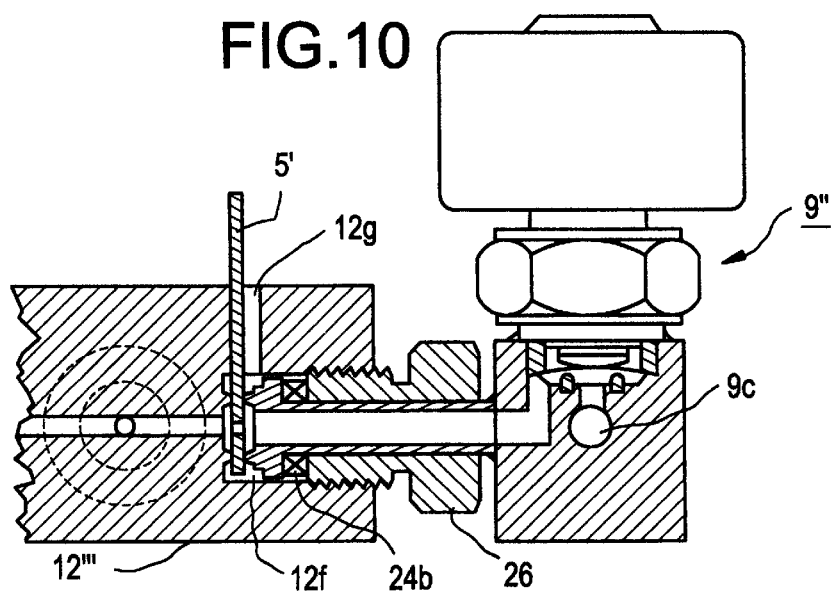
FIG. 10 is a segmented, vertical sectional view showing a further different embodiment for providing an orifice in a valve main body of a control valve of this invention.

FIG. 10 shows a different example for positioning an orifice forming member 5', with the orifice forming member 5' itself being exchangeable.

That is, a ring-shaped contact surface is formed in an orifice mounting hole 12f of a valve main body 12''', and an orifice insertion hole 12g is formed in a direction perpendicular to a fluid passage. The plate-shaped orifice forming member 5' is inserted into the mounting hole 12f from above through the insertion hole 12g, and, by tightening a tightening holding element 26, the orifice forming member 5' is fixed via a bearing 24b.

When replacing the orifice forming member 5', depending on a flow rate range, the holding element 26 is loosened, the orifice forming member 5' is exchanged, and the holding element 26 is again tightened.

Figure 11:
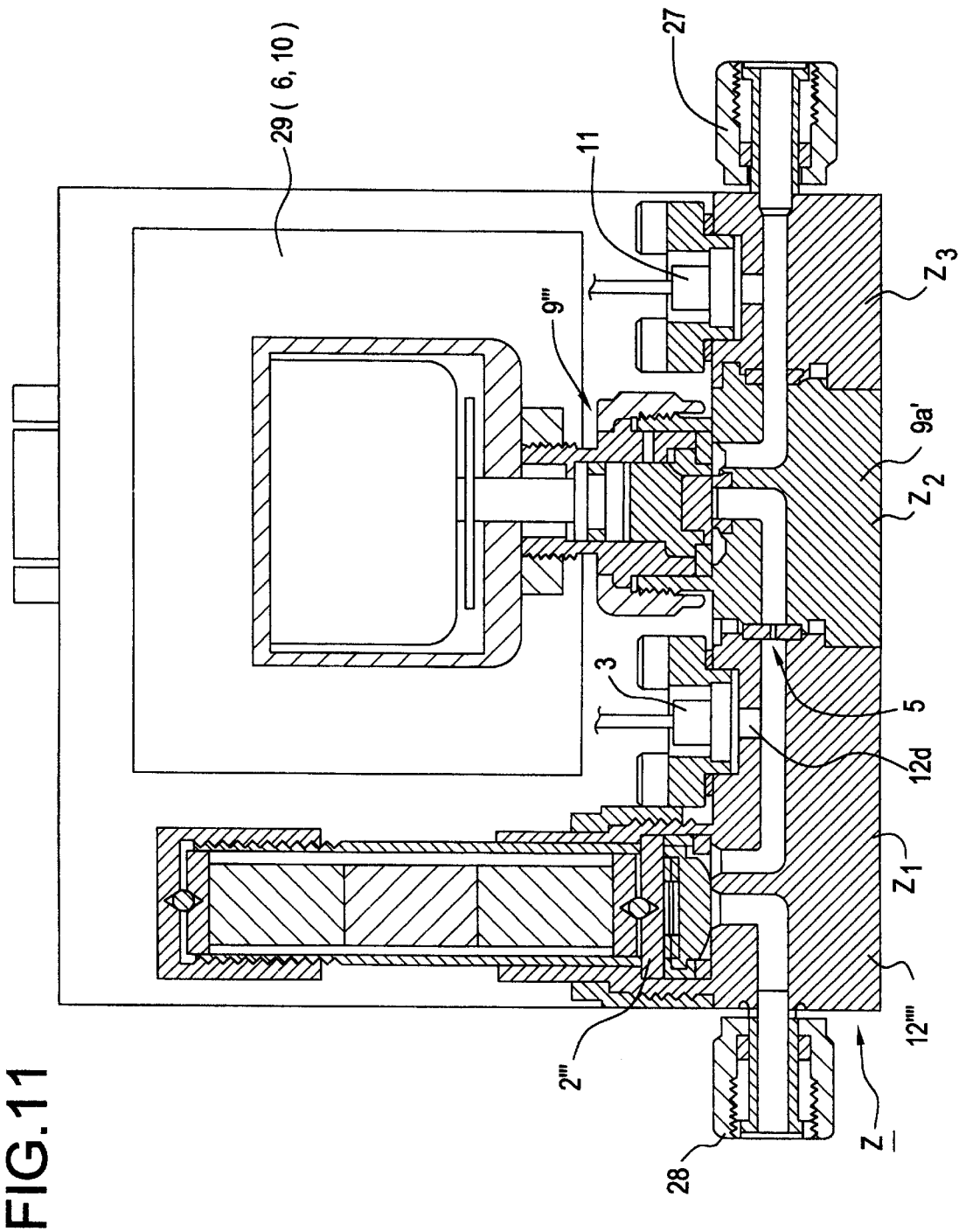
FIG. 11 is a vertical sectional view showing another embodiment the pressure type flow rate control apparatus of this invention.

FIG. 11 illustrates a different embodiment of the present invention in which a valve main body 12"" of a control valve 2''' and a valve main body 9a' of an orifice corresponding valve 9 of the first embodiment as shown in FIG. 3 are formed in one piece and constructed in the shape of a block in which mounting holes for mounting the pressure detectors 3, 11 and a mounting hole for mounting the orifice 5 are formed.

That is to say, the control valve 2''', an orifice corresponding valve 9''', and other elements which constitute the present pressure type flow rate control apparatus are all constructed in a single main block body Z which comprises and is an assembly of Zi, Z2 and Z3.

In FIG. 11, 27 identifies the gas take-out joint, 28 a gas supply joint, 29 a control board forming the flow rate calculation apparatus 6 and the pressure comparing, calculating apparatus 10, Z a main block body, and Z1 to Z3 block pieces. The control valve 2''', the orifice corresponding valve 9''', the primary pressure detector 3, the secondary pressure detector 11 and other elements are all substantially the same as the corresponding ones used in the foregoing first embodiment.

In the invention, the valve main body 12"" of the control valve 2''' and the valve main body of the orifice 25 corresponding valve 9''' are formed in the shape of a block and an orifice mounting hole corresponding to the orifice mounting hole 12f in FIGS. 8 and 10, and a pressure detector mounting hole, corresponding to the pressure detector mounting hole 12d of FIG. 3, are formed integrally therein, and hence a volume of a fluid passage space inside the flow rate control apparatus is very small, and gas purging performance is enhanced.

Figure 12:
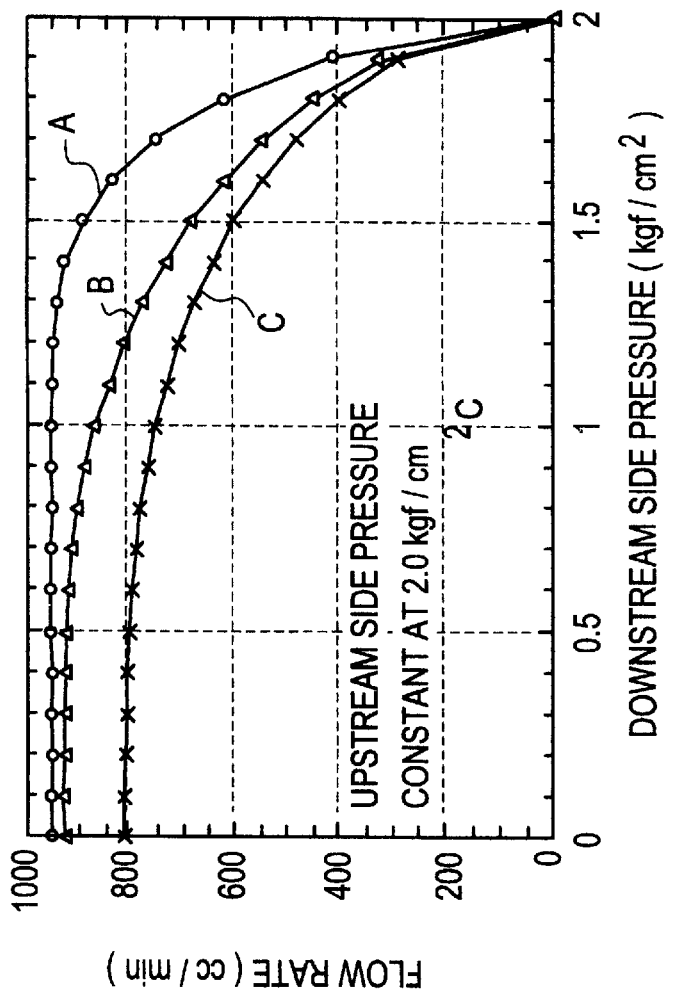
FIG. 12 is a diagram showing flow rate characteristics indicating relationships between downstream side pressures and flow rates when an orifice of this invention is used, with an upstream side pressure being constant.
Figure 13:
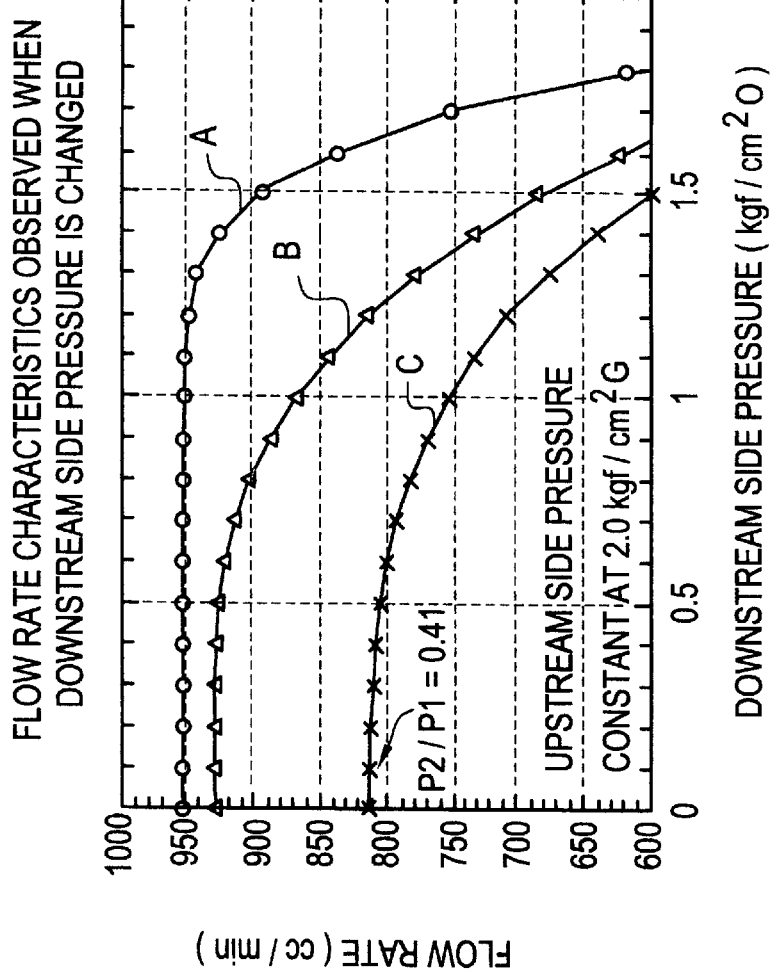
FIG. 13 is a segmented enlargement of FIG. 12.
Figure 14:
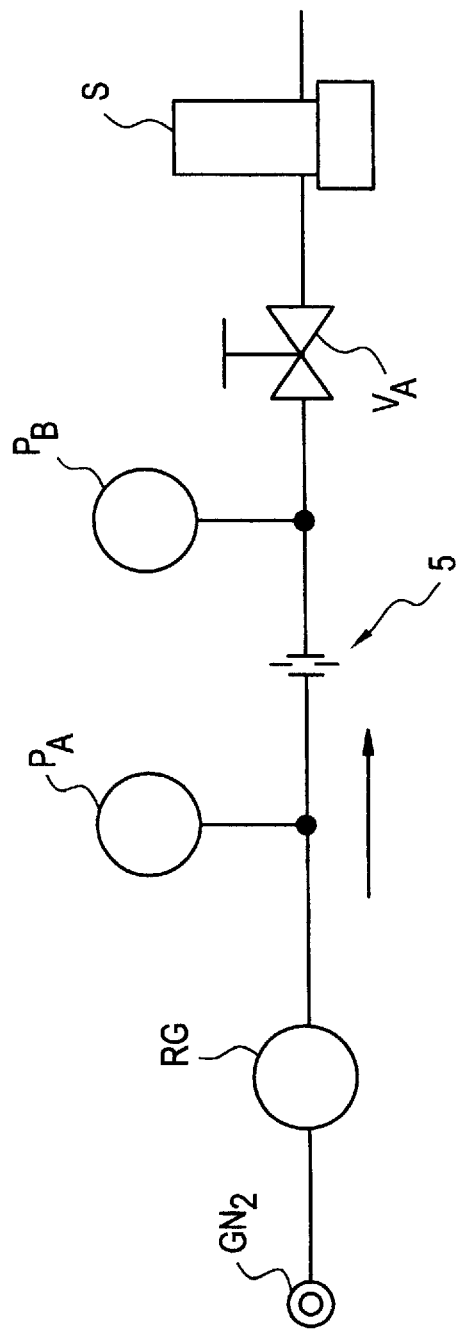
FIG. 14 is a block-diagram schematically showing an apparatus used in tests in which the characteristic curves indicated in FIGS. 12 and 13 were produced.

FIGS. 12 and 13 indicate characteristic curves of flow rate, measured by an experiment apparatus shown schematically in FIG. 14, which was observed using an orifice and other elements of the present invention when pressure on the downstream (secondary) side is changed. FIG. 13 is a partial enlargement of FIG. 12.

A curve A indicates the flow rate measured when $N_2$ gas was allowed to flow through the orifice (FIG. 2) of the present invention in a normal direction, a curve B indicates the flow rate measured when $N_2$ gas was allowed to flow through the orifice as shown in FIG. 2 in a direction opposite to FIG. 2, and a curve C indicates the flow rate observed in use of an orifice which is a round and straight (cylindrical) hole of 0.2 mm diameter (the pressure on the upstream (primary) side being maintained at a fixed value of 2.0 $Kgf/cm^2G$).

The flow rates (cc/min.) in FIGS. 12 and 13 are obtained after reduced at 0° C. 0.760 mm Hg.

In FIG. 14, $GN_2$ identifies a nitrogen gas source, RG a pressure reduction valve, $P_A$ a pressure gauge with an analog output, $P_B$ a precision pressure gauge, $V_A$ a downstream side pressure adjuster, 5 the orifice and S a soap membrane flow rate detector.

As seen from the curve A in FIGS. 12 and 13, when the gas is allowed to flow in the normal direction through the orifice 5 of the present invention (i.e. the orifice in FIG. 2), the secondary side gas flow rate is a fixed value in the range of P2/P1 of less than about 0.7 (i.e. P1/P2 of about 1.4 or more), irrespective of fluctuations in the secondary side pressure P2.

Figure 15:
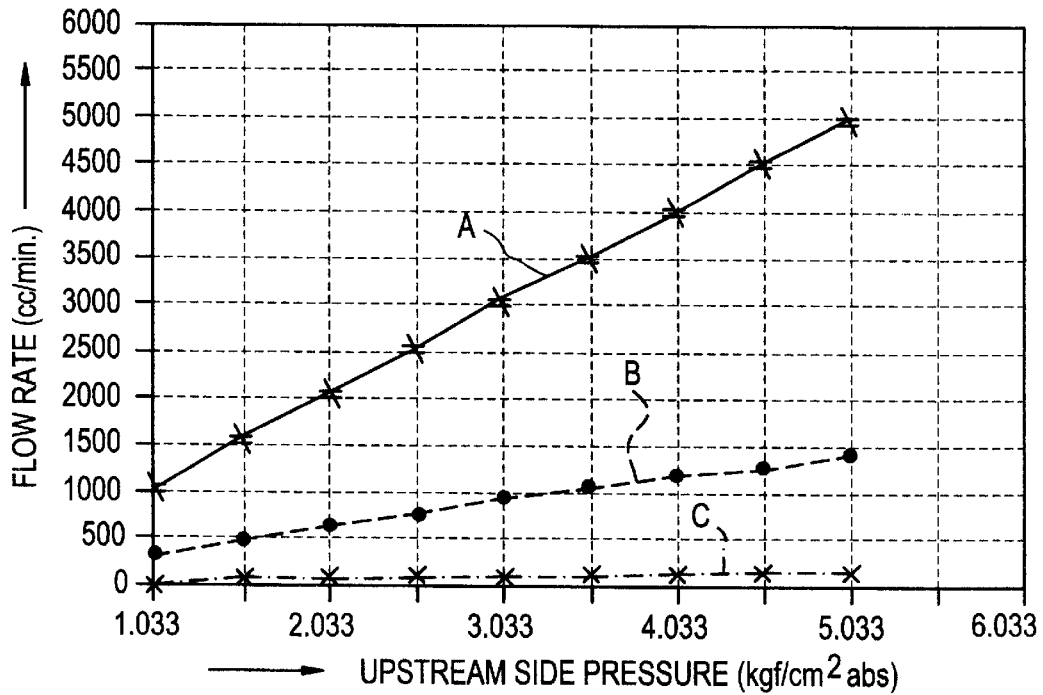
FIG. 15 is a diagram showing flow rate control characteristics of a pressure type flow rate control apparatus of this invention, with a downstream pressure of the orifice being at a vacuum.
Figure 16:
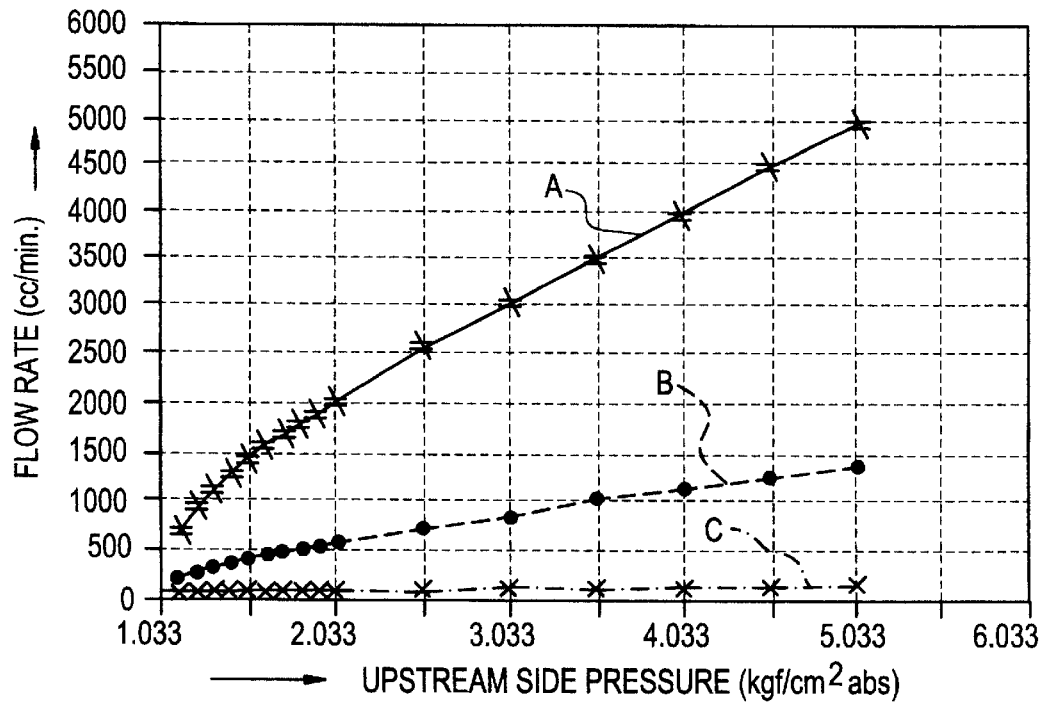
FIG. 16 is a diagram showing flow rate control characteristics of a pressure type flow rate control apparatus of this invention when the pressure downstream of the orifice is at atmospheric pressure; and, FIG. 17 is a block diagram of a conventional differential pressure type flow rate control apparatus.
Figure 17:
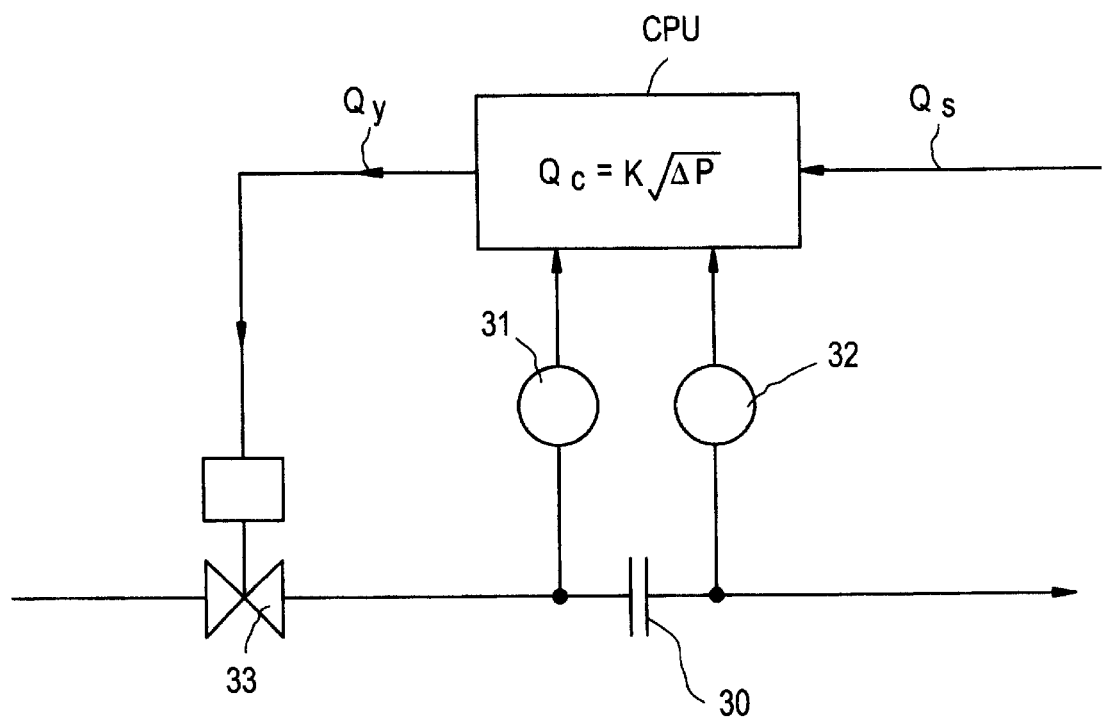

FIGS. 15 and 16 show flow rate control characteristics when gas of a pressure type flow rate control apparatus of the invention is nitrogen, and more specifically the downstream side of the orifice 5 has a vacuum thereat of about 10 Torr (in FIG. 15), and the downstream side is at atmospheric pressure (in FIG. 16).

It is clear from FIGS. 15 and 16 that in a range where the ratio of P2/P1 between the upstream side pressure Pi and the downstream side pressure P2 is about 0.7 or less, the flow rate Qc and P1 are kept in linear relation. In FIGS. 15 and 16, curves A, B, C refer to orifice inside diameters of respective orifices of round and straight (cylindrical) holes 5 of 0.37 mm, 0.20 mm and 0.07 mm.

Table 1 compares precisions and other properties between a pressure type flow rate control apparatus of the invention with that of a conventional differential pressure type flow rate control apparatus, assuming that the measuring ranges and precisions of the pressure detectors used are identical.

TABLE 1

|  | Differential pressure type flow rate control apparatus | The invention |
|---|---|---|
| Measuring range of pressure detector | 1:50 | 1:50 |
| Precision of pressure detector | ±0.25% | ±0.25% |
| Calculated flow rate range | 1:7 | 1:50 |
| Flow rate measuring precision | ±0.9% | ±0.25% |
| Measuring range at maximum graduation of 100 cc/min | 14–100 | 2–100 |
| Size (supposing differential flow meter to be 1) | 1 | 0.5 |

As is clear from this table, the invention is, as compared with the differential pressure type flow rate control apparatus, excellent in measuring precision of flow rate and measuring range, and is physically smaller in size.

Table 2 compares characteristics between a conventional standard mass flow controller and the invention. As is clear from this table, too, the invention is clearly superior to the mass flow controller in measuring precision in low flow rate ranges and in manufacturing costs.

TABLE 2

|  |  | Mass flow controller | The invention |
|---|---|---|---|
| Precision | Error as against the maximum flow rate | ±1% | ±0.25% |
|  | Error at flow rate of 2% of maximum flow rate | ±50% | ±12.5% |
| Trouble | Initial failure | Present (Yes) | None |
|  | Clogging of valve | Present (Yes) | Possible |
| Cost | Manufacturing cost | 1 | 0.75 of mass flow controller |
|  | Running cost | High | None |

In the invention, as compared with conventional differential pressure type flow rate control apparatus, a higher flow rate detecting precision is achieved, and apparatus size is reduced; hence manufacturing costs are lowered.

As mentioned above, in the present invention, by keeping P2/P1 (between the absolute pressure P1 at the upstream side of the orifice and the absolute pressure P2 at the downstream side) at about 0.7 or less, a linear function is established between the pressure P1 and the flow rate downstream of the orifice. On the basis of this relationship, by adjusting P1 at the upstream side, the downstream side flow rate Qc is automatically controlled at a set value. As a result, the measuring precision in the flow rate range is raised, the breakdowns are less, and the costs of manufacturing the apparatus are substantially lowered in comparison with conventional mass flow controllers.

Further, according to the present invention, a higher precision of detecting the flow rate is obtained, the size of the apparatus is smaller and the costs for manufacturing the apparatus are lower, in comparison with conventional differential pressure type flow rate control apparatus.

Furthermore, in the invention, by controlling the pressure P1 at the orifice upstream side, the orifice downstream side flow rate is obtained in a linear-function form as a function of the pressure P1, and hence feedback control of flow rate is easy, stability of the control apparatus is enhanced, and manufacturing costs are lowered.

In addition, the present invention has the pressure comparing, calculating apparatus and the pressure at the downstream side of the orifice is measured. If a ratio of P2/P1 exceeds a set value, the orifice corresponding valve and/or the control are changed over to a state in which they are manually operated for supplying the gas by manual flow rate adjustment. If P2/P1 approaches 1.0, which is a dangerous state where a counter flow is expected to occur, the orifice corresponding valve is automatically closed.

As a result, if a certain pressure relationship exists between the pressure P1 at the primary side of the orifice and the pressure P2 at the secondary side, flow rate control apparatus is carried out by manual operation. Hence, a highly precise flow rate control is possible.

Further, since a gas supply is also affected by the manual operation, an operation range of the flow rate control apparatus is expanded. Also, since a counter flow of the gas is automatically prevented, safety of the apparatus is enhanced.

Some gases, among special material gases for producing semi-conductors and other items, are easily decomposed at relatively low temperatures due to catalyses of piping materials. Hence, it is necessary to apply a treatment (for instance, a chromium oxide passive state treatment and a fluoride passive state treatment) to inner surfaces of the piping materials for preventing catalyses. But, the flow rate control apparatus of the present invention is simple as to its inner structure. Hence, the above mentioned treatment can be easily applied to the entire inner surfaces. Thus, the invention has advantages in practical application.

Further, the pressure type flow rate control apparatus of the present invention can be constructed such that the control valve, the orifice corresponding valve, the pressure detectors, the orifice and other elements are integrated into a main body block. As a result, it is possible to substantially reduce a volume of fluid passage spaces. Also, dead spaces for trapping fluids are hardly formed in the fluid passages.

As a result, gas purging performance is enhanced and lowered gas purity is almost completely prevented. The invention thus brings about excellent practical effects.

The invention claimed is:

1. A pressure type flow control apparatus for controlling flow rate of a fluid in a state where a ratio of P2/P1 between an absolute pressure P1 at an upstream side of an orifice and an absolute pressure P2 at a downstream side of the orifice is maintained at about 0.7 or less, comprising:

a means for forming the orifice (5);

a control valve (2) positioned upstream of the orifice and a drive unit (14) for regulating the control valve;

an orifice corresponding valve (9) positioned downstream of the orifice (5);

a primary pressure detector (3) positioned between the control valve (2) and the orifice(5);

a secondary pressure detector (11) positioned downstream of the orifice (5);

a calculation control device for calculating flow rate Qc on the basis of a detected pressure P1 of the primary pressure detector (3) by a formula Qc=KP1 (K being constant), and for outputting, as a control signal Qy, a difference between a flow rate command signal Qs and the calculated flow rate signal Qc, to the drive unit (14) of the control valve (2); and, a pressure comparing, calculating apparatus (10) for calculating the ratio of P2/P1 between the detected pressure P1 of the primary pressure detector (3) and a detected pressure P2 of the secondary pressure detector (11);

wherein the pressure P1 upstream of the orifice is adjusted by opening and closing the control valve by the control signal Qy, thereby controlling the flow rate downstream of the orifice.

2. A pressure flow rate control apparatus as claimed in claim 1 wherein the pressure comparing, calculating apparatus (10) includes a means for dispatching a warning signal if the ration of P2/P1 between the detected pressure P1 of the primary pressure detector (3) and the detected pressure P2 of the secondary pressure detector (11) exceeds about 0.7 and the pressure type flow rate control apparatus is constructed such that at least a respective one of the control valve (2) and the orifice corresponding valve (9) is changed over, by the warning signal, to be controlled manually or by a different system.

3. A pressure type flow rate control apparatus as claimed in claim 1 wherein the pressure comparing, calculating apparatus (10) includes a means for dispatching a warning/valve-closing signal, to at least one of the control valve (2) and the orifice corresponding valve (9) if the ratio of P2/P1 between the detected pressure P1 of the primary pressure detector (3) and the detected pressure P2 of the secondary pressure detector (11) is about 1.0.

4. A pressure type flow rate control apparatus as claimed in claim 1 wherein the orifice (5) has a vertical sectional shape which is similar to that of an open mouth of a bugle and the orifice (5) has a portion with a maximum diameter facing an upstream side, a portion with a minimum diameter located at a middle, and a portion with a medium diameter facing a downstream side.

5. A pressure type flow rate control apparatus as claimed in claim 1 wherein the means for forming the orifice can be exchanged with another means for forming an orifice.

6. A pressure type flow rate control apparatus as claimed in claim 1 wherein a valve main body (12) of the control valve (5) and a valve main body (9a) of the orifice corresponding valve (9) are formed as one piece and constructed in a block shape defining a mounting hole for mounting the primary pressure detector, a mounting hole for mounting the secondary pressure detector and a mounting hole for mounting the means for forming the orifice.

* * * * *